Feb. 10, 1959     G. R. HADFIELD     2,872,989
APPARATUS FOR SEVERING AND ROLLING
UP STRIPS OF A SOD RIBBON
Filed March 15, 1957     3 Sheets-Sheet 1
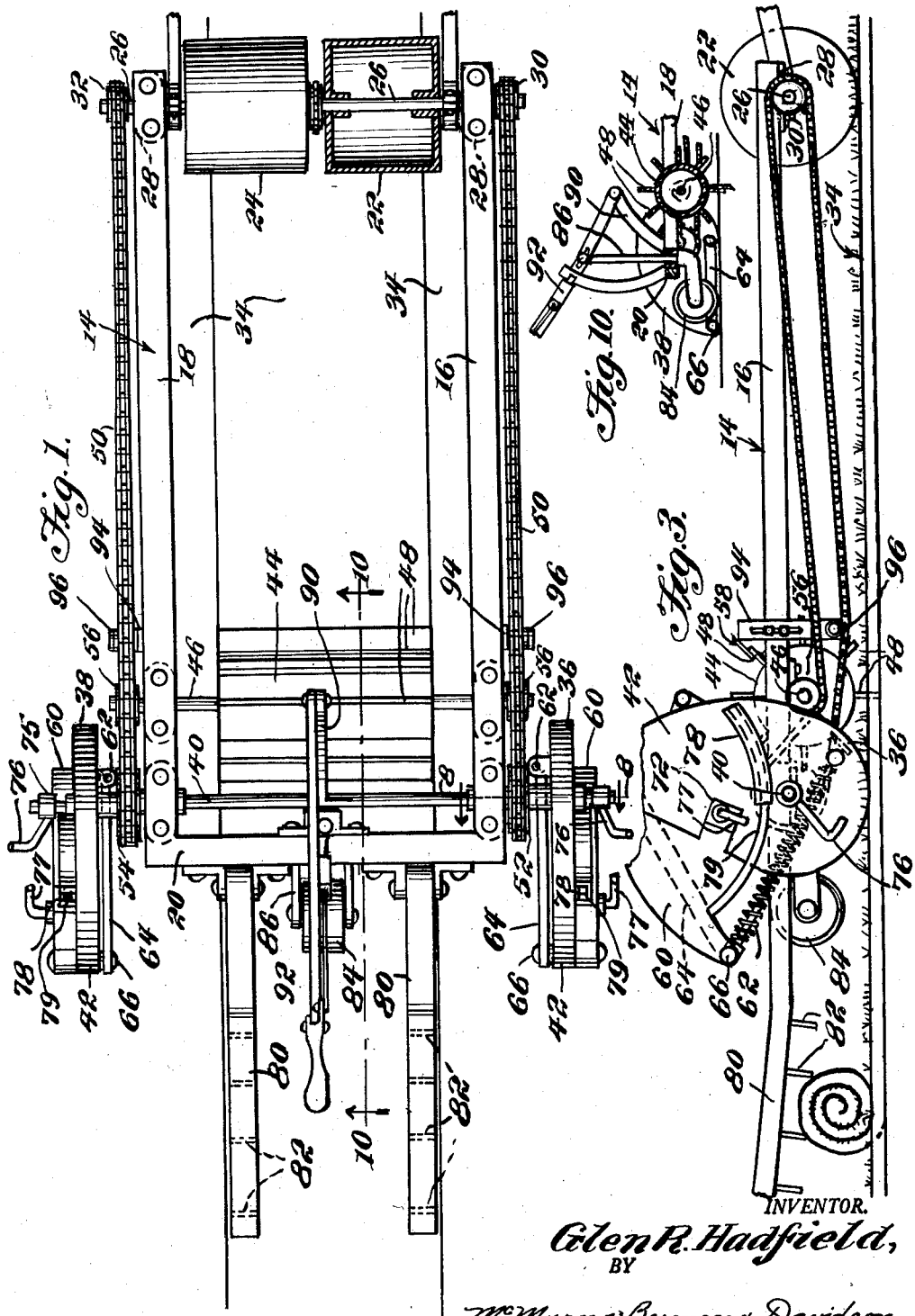
INVENTOR.
Glen R. Hadfield,
BY
McMorrow, Berman & Davidson
ATTORNEYS

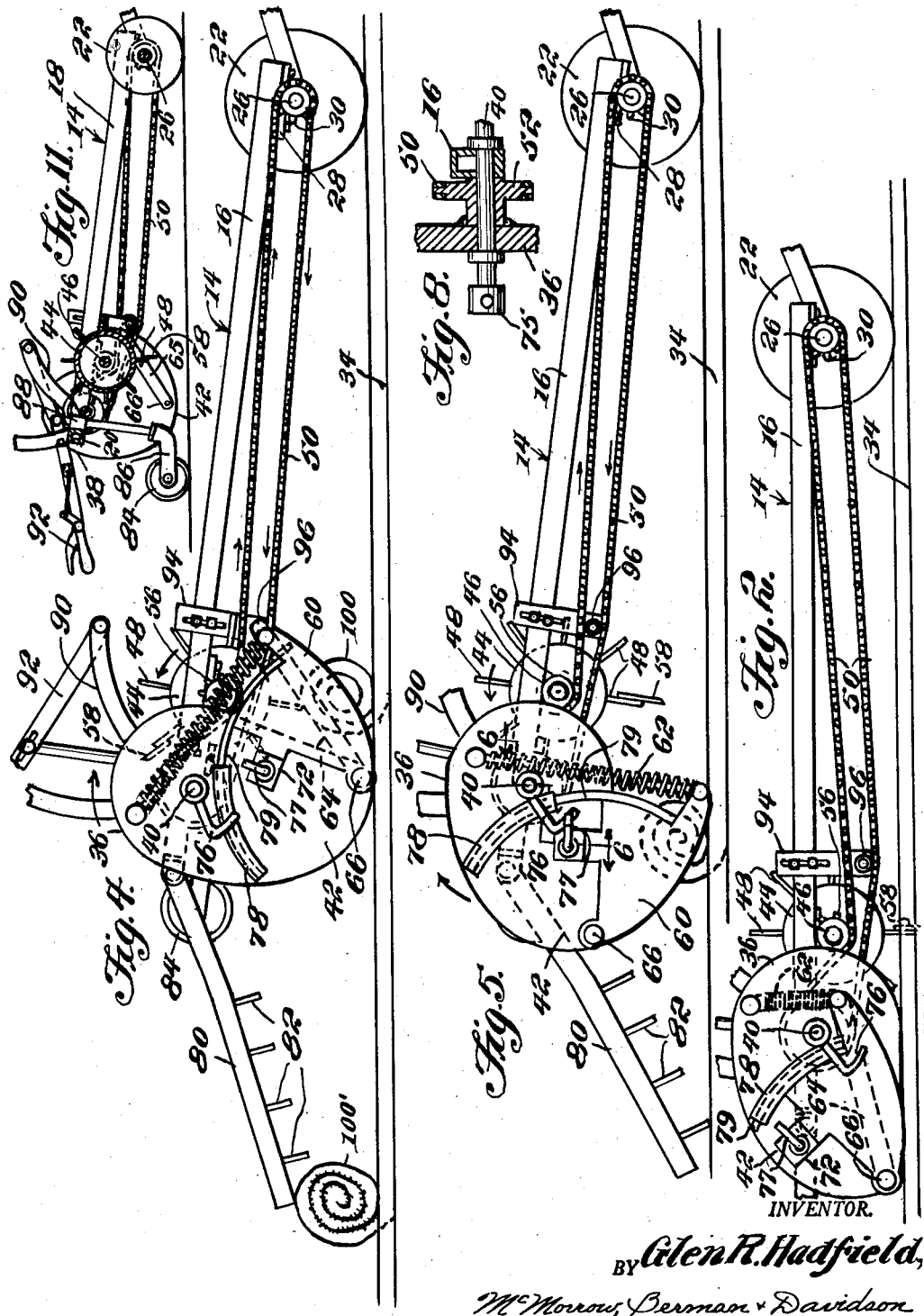

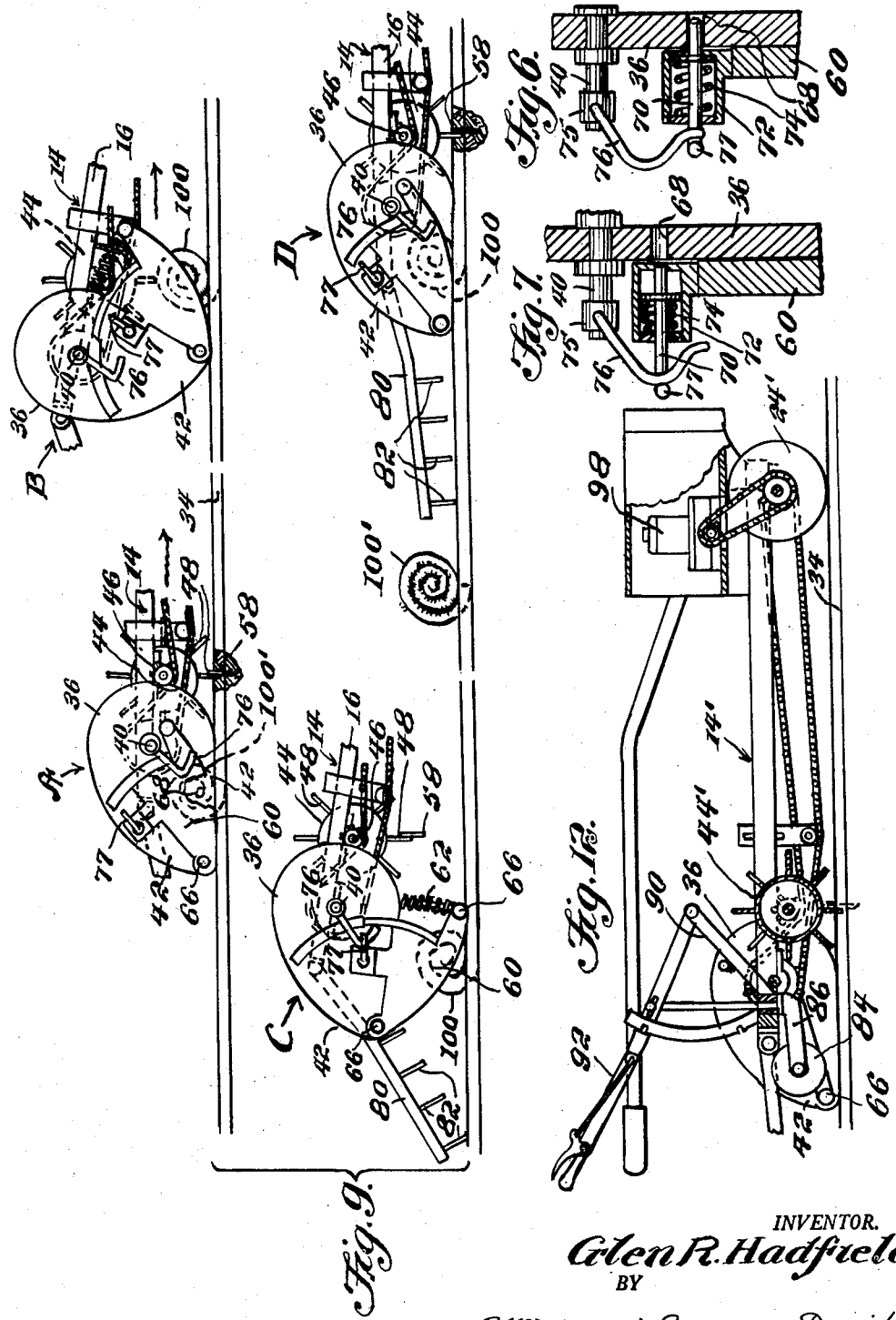

United States Patent Office 2,872,989
Patented Feb. 10, 1959

2,872,989

APPARATUS FOR SEVERING AND ROLLING UP STRIPS OF A SOD RIBBON

Glen R. Hadfield, Detroit, Mich.

Application March 15, 1957, Serial No. 646,399

5 Claims. (Cl. 172—20)

The present invention relates to an apparatus for severing successive lengths from a ribbon of sod previously cut and laying in a flat strip.

An object of the present invention is to provide an apparatus for severing lengths of a ribbon of sod and rolling the same, which lends itself to efficient harvesting of sod in roll form, obviating the necessity for manually rolling the cut sod into rolls, and providing such an apparatus as to quickly and efficiently clear a field of sod for commercial sale of the same.

Another object of the present invention is to provide an apparatus for severing successive lengths from a ribbon of sod automatically and with a minimum of attention, one which is sturdy in construction and simple in structure, requiring no skilled help in its operation, and one which is economical to manufacture and assemble.

These and other objects and advantages of the present invention will be fully apparent from the following description when taken in connection with the annexed drawings, in which:

Figure 1 is a plan view of the apparatus of the present invention,

Figure 2 is a side view of a portion of the device of Figure 1, showing the sod ribbon severing blade in a position severing the sod ribbon, Figure 3 is a side view, similar to Figure 2, and with a portion broken away showing the blade approaching an elevated position and with successive spade-like members continuing to lift and roll up the severed sod piece, Figure 4 is another side view, similar to Figures 2 and 3, showing the rearward end of the frame of the apparatus in an elevated position, with one of the spade-like members in a position prior to completing the partial rolling of the sod piece, Figure 5 is still another side view, similar to Figures 2 to 4 inclusive, showing the rearward end of the frame elevated and prior to its return to the horizontal position, Figure 6 is a sectional view, on an enlarged scale, taken on the line 6—6 of Figure 5, showing the auxiliary lobe latch means prior to release, Figure 7 is a sectional view similar to Figure 6, showing the auxiliary lobe latch means after release, Figure 8 is a sectional view, on an enlarged scale, taken on the line 8—8 of Figure 1, Figure 9 is a diagrammatic view of the successive movements of the wheel and the adjacent auxiliary lobe of the apparatus, Figure 10 is a sectional view, on a reduced scale, taken on the line 10—10 of Figure 1, showing the dolly wheel in an out of use position, Figure 11 is a sectional view similar to Figure 10, but showing the dolly wheel in a position of use, and Figure 12 is a sectional view of a modified form of the apparatus according to the present invention.

Referring in greater detail to the drawings in which like numerals indicate like parts throughout the several views, the sod ribbon severing and rolling up apparatus, according to the present invention, comprises a horizontally disposed frame 14 having spaced side members 16 and 18 connected together at the rearward end of the frame 14 by a cross member 20. At the forward end of the frame, a pair of rotatable ground engaging rollers 22 and 24 are arranged in end to end relation, transversely of the frame 14, and are fixedly secured on an axle 26 which has portions adjacent each of its ends mounted in suitable bearing blocks 28, as seen in Figure 1. The free end portions of the axle 26 have sprocket gears 30 and 32 mounted thereon for rotational movement with the rollers 22 and 24. The rollers 22 and 24 are rotatable in a clockwise direction when viewed in Figures 2 to 5 inclusive, and in Figures 11 and 12. The rollers 22 and 24 are adapted to travel along a ribbon of sod, designated by the reference numeral 34, in a field, the sod ribbon being previously cut along the side edges and severed from the soil by conventional sod cutting machinery, here not shown, as not being a part of the invention.

A rotatable ground engaging element, embodying a wheel 36, is positioned along and outwardly of the side member 16 and another wheel 38 is similarly positioned with respect to the side member 18, both of the wheels 36 and 38 being adjacent the rearward end of the frame 14 and supporting the rearward end of the frame 14. The wheels 36 and 38 are mounted upon an axle 40 extending transversely of the frame 14.

The wheels 36 and 38 are identical and will be described with reference to the wheel 36. A lobe 42 projects from a part of the periphery of the wheel 36 and serves to elevate the rearward end of the frame 14 above the horizontal position upon rotation of the wheels 36 and 38, the elevated position being shown in Figures 4 and 5. The lobe 42, and the corresponding lobe on the wheel 38, constitute means on the respective ones of the ground engaging elements engageable upon execution of a part of the predetermined number of revolutions of the rotary movements of the elements with the ground surface adjacent the sod ribbon 34 when the rollers 22 and 24 execute their traveling movement along the ribbon of sod 34 to in turn elevate the rearward end of the frame 14 and subsequently lower the rearward end of the frame 14, due to the application of the force of gravity thereto, to the horizontal position normally occupied by the rearward end of the frame 14.

A horizontally disposed rotatable hub 44 arranged transversely of the frame 14 is positioned between and forwardly of and adjacent the ground engaging elements 36 and 38. Specifically, the hub 44 is carried by a shaft 46 arranged transversely of and supported on the frame 14, the shaft 46 being forwardly of and adjacent the axle 40 carrying the ground engaging elements 36 and 38. A plurality of spade-like members 48 project in radial spaced relation from the periphery of the hub 44 and are adapted to successively lift and at least partially roll up the cut piece of sod 34 as the hub 44 rotates in the counterclockwise direction. A drive chain 50 connects each of the sprocket gears 30 and 32 with the respective one of a pair of sprocket gears 52 and 54 fixedly secured to the wheels 36 and 38, respectively, as shown in Figure 8.

As shown in Figures 1 to 5 inclusive, the chains 50 are in engagement with sprocket gears 56 carried on each end of the shaft 46. The engagement of the chains 50 with adjacent sprocket gears 56 causes the hub 44 to rotate in a counterclockwise direction in response to clockwise rotary movement of the rollers 22 and 24.

A cutting blade 58 projects beyond the free end of one of the spade-like members 48 and is adapted to sever the ribbon of sod 34 upon downward movement of the rearward end of the frame 14 and released by the elevating means.

Means is provided for causing the elevating means to abruptly release the rearward end of the frame 14 from the elevated position, so that the cutting blade 58 has sufficient force to completely sever the sod 34. Specifically, this means includes an auxiliary lobe 60 positioned on one side of each of the fixed lobes 42 on each of the wheels 36 and 38 and connected to the adjacent fixed lobe 42 for swinging movement away from the fixed lobe 42.

Spring means is provided operatively connected to the auxiliary lobe 60 associated with each of the wheels 36 and 38 and to the adjacent fixed lobe 42 for biasing the auxiliary lobe 60 to the position away from the fixed lobe 42. Specifically, this means embodies a compression spring 62 having one end secured to the adjacent auxiliary lobe 60 and its other end secured to the respective one of the fixed lobes 42. The auxiliary lobe 60 is on the exterior side of each of the wheels 36 and 38 and the compression spring 62 is on the opposite side of such wheels, there being provided an arm 64 splined to a shaft 66 extending through the lobe 42 of each of the wheels and having the free end thereof also splined to the auxiliary lobe 60. The arms 64 constitute the means by which the one end of the associated compression spring 62 is connected to the auxiliary lobe 60.

Releasable cooperating latch means is provided on each of the fixed lobes 42 and the adjacent auxiliary lobe 60 for holding the auxiliary lobe in its extended position away from the associated wheels 36 and 38 and the adjacent fixed lobe 42. Specifically, this latch means embodies, as shown most clearly in Figure 6 and 7, a hole 68 provided in each of the wheels 36 and 38 and a latch pin 70 slidably mounted in a boss 72 which projects outwardly from the adjacent portion of the fixed lobe 42 of each of the wheels 36 and 38. A spring 74 within each of the bosses 72 biases the associated latch pin 70 to the position in which it has one end portion engaged within the adjacent hole 68.

On each end of the fixed axle 40 is a collar 75 through which extends one end of a rigid rod 76 bent to serve as a cam, as seen in Figures 6 and 7 in detail. The cam rod 76 engages the portion of the latch pin 70 adjacent the free end thereof as the associated wheel 36 or 38 rotates, the free end portion of the latch pin 70 being bent at an angle to the remainder of the pin. The bent portion of the latch pin 70 is designated by the reference numeral 77. A curved channel member 78 is secured to the outer face of the portion of each wheel 36 and 38 adjacent the lobe 42 and receives therein a curved bar 79 which projects from the adjacent edge of the auxiliary lobe 60. The channel member 78 serves as a guide for the bar 79, so that the auxiliary lobe 60 is prevented from sideways movement relative to the lobe 42.

Projecting rearwardly from the frame cross member 20 are arms 80 arranged in parallel spaced relation and each having one end pivotally connected to the adjacent portion of the cross member 20 for swinging movement about a horizontal axis. Dependingly carried by each of the arms 20 are a plurality of vertically disposed spade-like members 82 rigidly attached to the under side of the adjacent arm 80.

Means is provided for lifting the rearward end of the frame 14 to an elevated position for transport of the apparatus to and from the field in which the sod is grown. This means includes a dolly wheel 84 rotatably mounted on the rear end of a pivotally connected L-shaped wheel support 86, one leg of which extends vertically and is journaled in a sleeve 88 fixed to the mid-point of the cross member 20, this structure being seen most clearly in Figures 10 and 11. A fulcrum piece 90 and a handle 92 connected to the vertical leg of the support member 86 form a means for elevating the adjacent portion of the frame 14 when the handle 92 is depressed to the position shown in Figure 11, which causes the dolly wheel 84 to be extended below the lowermost points of the wheels 36 and 38 and thereby permitting the transport of the apparatus without the engagement of the wheels 36 and 38 with the ground surface.

Means is provided for adjusting the tension of the drive chain 50 and consists in a downwardly depending bracket 94 dependingly secured to each of the frame side members 16 and 18 forwardly of the hub 44 and carrying on its lower end an idler roller 96 engageable with the chain 50, the bracket 94 being adjustably positioned upon the adjacent frame side members 16 or 18, so that the roller 96 may apply tension to the drive chain 50.

In Figure 12 a modified form of the apparatus of the present invention is shown in which all the heretofore described components are present, including a frame 14' and a hub 44', there being added an internal combustion engine 98 drivably connected to the rollers 24' for self-propelling the apparatus over the field.

In operation, as shown diagrammatically in Figure 9, the apparatus of the present invention in its first embodiment, is towed behind a sod cutting machine, or other vehicle (not shown), with the rollers 22 and 24 either rolling over the sod strip or on either side of the sod strip to be rolled. In the portion of Figure 9 designated by the letter A, the wheel 36 is shown in the position of beginning to roll on the concentric portion of its periphery and the cutting blade 58 has just penetrated the sod 34 and has severed the strip of sod. The arrow adjacent the hub 44 indicates the direction of rotation of the hub 44 with the one spade-like member 48 bearing the blade 58 engaging the cut end of the sod 34 and slipping under it to lift it upwardly. It is a characteristic of a sod piece that the interlacing of the grass leaves and runners causes the sod piece to bend easily in the direction of its upper or grass side with the soil surrounding the roots and the roots, as well, separating sufficiently to permit rolling of the piece into a roll with the grass side innermost in the roll and with the soil side outermost. The sod, therefore, is engaged by the spade-like members 48 in turn as the hub 44 rotates in response to forward movement of the frame 14 and driven by the drive chain 50 connected to the rollers 22 and 24. The wheel 36, after rolling over its concentric portion, rolls over the perimeter of the lobe 42 and commences to roll onto the perimeter of the auxiliary lobe 60, as shown at B. The spring 62 has previously, between the positions A and B, forced the auxiliary lobe 60 to the extended position away from the periphery of the wheel 36 and the latch pin 70 has been forced by its associated spring 74 into the hole 68 in the wheel 36, locking the auxiliary lobe 60 in a position in which it serves as an extension of the lobe 42.

The sod 34 has now been partially rolled into a roll 100 and the hub 44 has been raised at substantially the same rate of elevation as the increase in diameter of the roll 100 due to the camming action of the lobe 42. Continuing to roll on the perimeter of the auxiliary lobe 60, the apparatus draws ahead, so that the partially rolled sod slips beneath the hub 44 and the lowermost ones of the members 48. When the portion of the auxiliary lobe 60, adjacent the free end thereof, begins to bear against the ground surface, as at C, the portion 77 of the latch pin 70 is engaged by the rod 76 and the latch pin is released. Gravity acting upon the rearward end of the frame 14 drops the rearward end of the frame 14 and causes the cutting blade 58, which has been moved to the lowermost position with respect to the hub 44, to penetrate the soil and sod and to sever the strip of sod. The forward motion of the apparatus has caused the hub 44 to move forwardly of the present position of the partially rolled up sod, so that the cutting blade 58 enters and severs the sod at a point some distance ahead of the partially rolled up sod. For this reason, the arms 80 have been provided with the spade-like members 82 depending therefrom. As the apparatus moves forwardly, the members 82 engage the partial rolled sod 100 and continue to roll it upwardly until the end of the strip has been reached to produce a fully rolled up strip of sod 100' lying free upon the ground surface rearwardly of the arms 80, as in position D in which the cutting blade 58 has again severed the strip of sod and has commenced to roll up the strip of sod into a further roll of sod.

While only preferred embodiments of the present invention have been shown and described, numerous changes and modifications may be made without departing from the spirit of the invention as defined in the appended claims.

What is claimed is:

1. Apparatus for severing strips of predetermined lengths from a ribbon of sod while lying in a flat strip and successively rolling up the severed strip comprising a horizontally disposed frame having a forward end and a rearward end, a rotatable ground engaging roller extending transversely of said frame and supporting the forward end of said frame adapted to rollably engage and travel along said ribbon, said roller being rotatable in a clockwise direction, a rotatable ground engaging element positioned along and outwardly of each side of said frame adjacent the rearward end thereof and supporting the rearward end of said frame, a horizontally disposed rotatable hub arranged transversely of said frame positioned between and forwardly of and adjacent said ground engaging elements, a plurality of spade-like members projecting in radial relation from the periphery of said hub, said ground engaging elements being adapted to engage a ground surface adjacent said ribbon and the spade-like members of said hub being adapted to successively lift and at least partially roll up a cut piece of said ribbon when said ground engaging roller is traveling along said ribbon, means connecting said hub and said ground engaging elements to said ground engaging roller for rotary movement of said hub in a counterclockwise direction and rotary movement of said ground engaging elements in clockwise direction responsive to the clockwise rotary movement of said roller, and means on each of said ground engaging elements engageable upon execution of part of one revolution of its rotary movement with the ground surface adjacent said ribbon when said ground engaging roller is traveling along said ribbon to in turn simultaneously elevate the rearward end of said frame and move said hub to a position in which one of said spade-like members is in a vertical position facing said ribbon and return the rearward end of said frame to its horizontal position and penetration of said one spade-like member through and making a cut in said ribbon, said one spade-like member and the other spade-like members successively lifting and at least partially rolling up the severed piece from the cut end when the ground engaging elements are executing the remaining part of said one revolution after the rearward end of said frame has been returned to the horizontal position.

2. Apparatus for severing strips of predetermined lengths from a ribbon of sod while lying in a flat strip and successively rolling up the severed strip comprising a horizontally disposed frame having a forward end and a rearward end, a rotatable ground engaging roller extending transversely of said frame and supporting the forward end of said frame adapted to rollably engage and travel along said ribbon, said roller being rotatable in a clockwise direction, a rotatable ground engaging element positioned along and outwardly of each side of said frame adjacent the rearward end thereof and supporting the rearward end of said frame, a horizontally disposed rotatable hub arranged transversely of said frame positioned between and forwardly of and adjacent said ground engaging elements, a plurality of spade-like members projecting in radial relation from the periphery of said hub, said ground engaging elements being adapted to engage a ground surface adjacent said ribbon and the spade-like members of said hub being adapted to successively lift and at least partially roll up a cut piece of said ribbon when said ground engaging roller is traveling along said ribbon, means connecting said hub and said ground engaging elements to said ground engaging roller for rotary movement of said hub in a counterclockwise direction and rotary movement of said ground engaging elements in clockwise direction responsive to the clockwise rotary movement of said roller, means on each of said ground engaging elements engageable upon execution of a part of one revolution of its rotary movement with the ground surface adjacent said ribbon when said ground engaging roller is traveling along said ribbon to in turn simultaneously elevate the rearward end of said frame and move said hub to a position in which one of said spade-like members is in a vertical position facing said ribbon and return the rearward end of said frame to its horizontal position and penetration of said one spade-like member through and making a cut in said ribbon, said one spade-like member and the other spade-like members successively lifting and at least partially rolling up the severed piece from the cut end when the ground engaging elements are executing the remaining part of said one revolution after the rearward end of said frame has been returned to the horizontal position, and rake means projecting longitudinally from the rearward end of said frame and engageable with a partially rolled up sod piece when the rearward end of said frame has been returned to the horizontal position to complete the rolling up of said partially rolled up sod piece.

3. The apparatus according to claim 1 which includes in addition a cutting blade projecting beyond the free end of said one spade-like member.

4. Apparatus for severing strips of predetermined lengths from a ribbon of sod while lying in a flat strip and successively rolling up the severed strip comprising a horizontally disposed frame having a forward end and a rearward end, a rotatable ground engaging roller extending transversely of said frame and supporting the forward end of said frame adapted to rollable engage and travel along said ribbon, said roller being rotatable in a clockwise direction, a rotatable ground engaging element positioned along and outwardly of each side of said frame adjacent the rearward end thereof and supporting the rearward end of said frame, a horizontally disposed rotatable hub arranged transversely of said frame positioned between and forwardly of and adjacent said ground engaging elements, a plurality of spade-like members projecting in radial relation from the periphery of said hub, said ground engaging elements being adapted to engage a ground surface adjacent said ribbon and the spade-like members of said hub being adapted to successively lift and at least partially roll up a cut piece of said ribbon when said ground engaging roller is traveling along said ribbon, means connecting said hub and said ground engaging elements to said ground engaging roller for rotary movement of said hub in a counterclockwise direction and rotary movement of said ground engaging elements in clockwise direction responsive to the clockwise rotary movement of said roller, means on each of said ground engaging elements engageable upon execution of part of one revolution of its rotary movement with the ground surface adjacent said ribbon when said ground engaging roller is traveling along said ribbon to in turn simultaneously elevate the rearward end of said frame and move said hub to a position in which one of said spade-like members is in a vertical position facing said ribbon and return the rearward end of said frame to its horizontal position and penetration of said one spade-like member through and making a cut in said ribbon, said one spade-like member and the other spade-like members successively lifting and at least partially rolling up the severed piece from the cut end when the ground engaging elements are executing the remaining part of said one revolution after the rearward end of said frame has been returned to the horizontal position, each of said ground engaging elements embodying a wheel and a fixed lobe projecting from a part of the periphery thereof, said last named means including an auxiliary lobe positioned on one side of each of the fixed lobes of said wheels and connected to the adjacent fixed lobe for swinging movement away from the fixed lobe, and releasable cooperating latch means on each of said fixed lobes and the adjacent auxiliary lobe for holding the latter in the away position.

5. Apparatus for severing strips of predetermined lengths from a ribbon of sod while lying in a flat strip and successively rolling up the severed strip comprising a horizontally disposed frame having a forward end and a rearward end, a rotatable ground engaging roller extending transversely of said frame and supporting the forward end of said frame adapted to rollably engage and travel along said ribbon, said roller being rotatable in a clockwise direction, a rotatable ground engaging element positioned along and outwardly of each side of said frame adjacent the rearward end thereof and supporting the rearward end of said frame, a horizontally disposed rotatable hub arranged transversely of said frame positioned between and forwardly of and adjacent said ground engaging elements, a plurality of spade-like members projecting in radial relation from the periphery of said hub, said ground engaging elements being adapted to engage a ground surface adjacent said ribbon and the spade-like members of said hub being adapted to successively lift and at least partially roll up a cut piece of said ribbon when said ground engaging roller is traveling along said ribbon, means connecting said hub and said ground engaging elements to said ground engaging roller for rotary movement of said hub in a counterclockwise direction and rotary movement of said ground engaging elements in clockwise direction responsive to the clockwise rotary movement of said roller, means on each of said ground engaging elements engageable upon execution of part of one revolution of its rotary movement with the ground surface adjacent said ribbon when said ground engaging roller is traveling along said ribbon to in turn simultaneously elevate the rearward end of said frame and move said hub to a position in which one of said spade-like members is in a vertical position facing said ribbon and return the rearward end of said frame to its horizontal position and penetration of said one spade-like member through and making a cut in said ribbon, said one spade-like member and the other spade-like members successively lifting and at least partially rolling up the severed piece from the cut end when the ground engaging elements are executing the remaining part of said one revolution after the rearward end of said frame has been returned to the horizontal position, each of said ground engaging elements embodying a wheel and a fixed lobe projecting from a part of the periphery thereof, said last named means including an auxiliary lobe positioned on one side of each of the fixed lobes of said wheels and connected to the adjacent fixed lobe for swinging movement away from the fixed lobe, spring means operatively connected to each of the fixed lobes and the adjacent auxiliary lobes urging said auxiliary lobes to the away position, and releasable cooperating latch means on each of said fixed lobes and the adjacent auxiliary lobe for holding the later in the away position, said spring means when said latch means is released yieldingly returning said frame rearward end to the horizontal position in response to the application of the force of gravity to said frame rearward end after said frame rearward end has been raised to the elevated position.

References Cited in the file of this patent

UNITED STATES PATENTS

| | | |
|---|---|---|
| 2,164,246 | Kirkpatrick | June 27, 1939 |
| 2,617,347 | Provost | Nov. 11, 1952 |